Nov. 2, 1954 P. A. RAICHE 2,693,191
INCONTINENCE URINAL BALLOON PLUG
Filed July 16, 1951
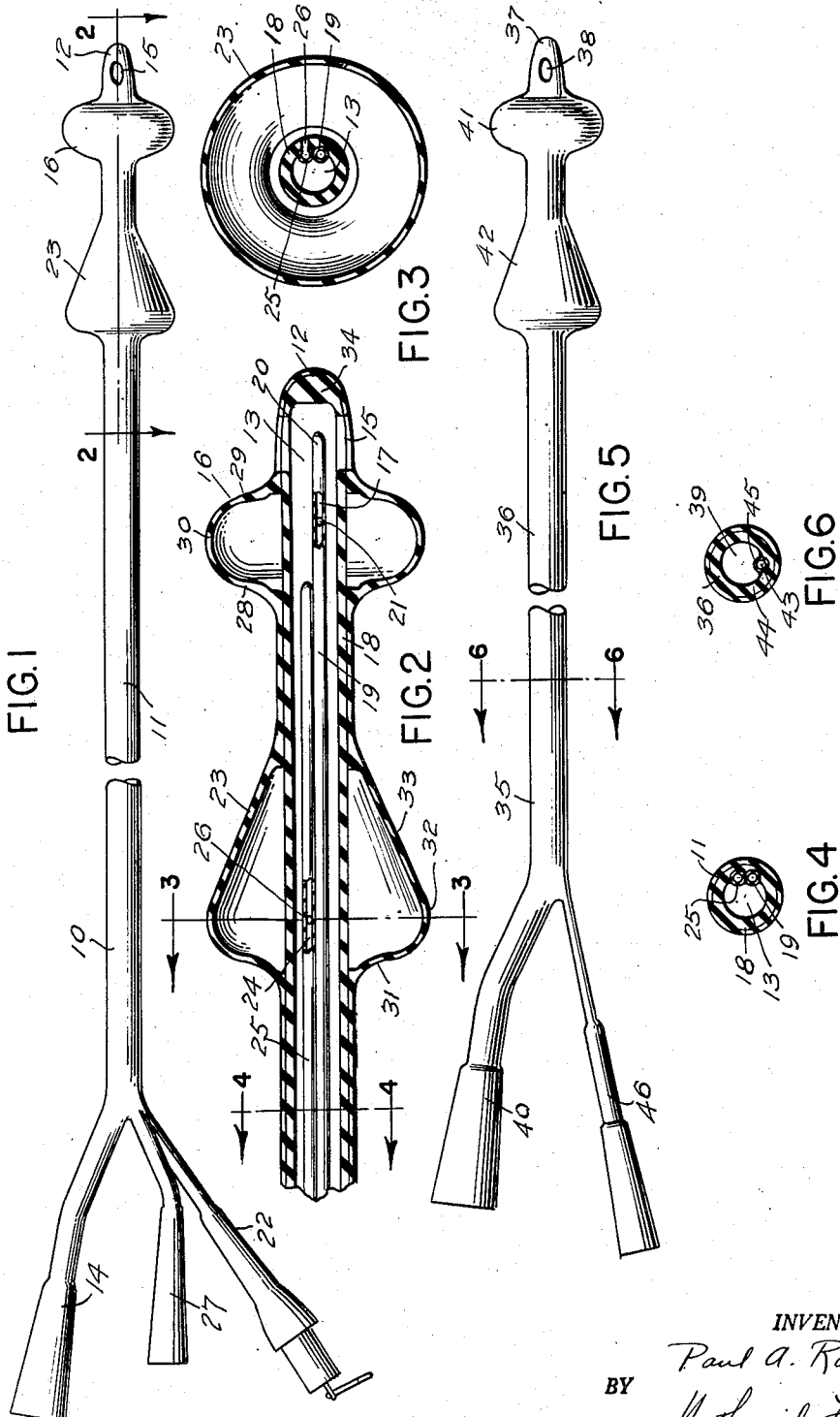
INVENTOR.
Paul A. Raiche
BY Nathaniel Frucht
ATTORNEY

United States Patent Office 2,693,191
Patented Nov. 2, 1954

2,693,191

INCONTINENCE URINAL BALLOON PLUG

Paul A. Raiche, North Providence, R. I., assignor to Davol Rubber Company, a corporation of Rhode Island Application July 16, 1951, Serial No. 236,914

4 Claims. (Cl. 128—349)

The present invention relates to the manufacture of hollow rubber articles, and has particular reference to the construction of incontinence urinal plugs.

The principal object of the invention is to provide an incontinence urinal plug having low pressure balloon retention elements.

Another object of the invention is to provide an incontinence urinal balloon plug which requires little or no dilating fluid under pressure.

A further object is to provide a plug of the type described with retention balloons which cannot collapse when in use.

An additional object of the invention is to provide a plug of the type described with balloon elements which cannot injure a patient by rupturing under pressure.

With the above and other objects and advantageous features in view, the invention consists of a novel arrangement of parts more fully disclosed in the detailed description following, in conjunction with the accompanying drawings, and more specifically defined in the claims appended thereto.

In the drawings,

Fig. 1 is a plan view of an illustrative incontinent plug embodying the invention;

Fig. 2 is a horizontal enlarged section through the upper portion thereof;

Fig. 3 is an enlarged section on the line 3—3 of Fig. 2;

Fig. 4 is an enlarged section on the line 4—4 of Fig. 2;

Fig. 5 is a longitudinal vertical section of a modified plug construction; and

Fig. 6 is an enlarged section on the line 6—6 of Fig. 5.

It has been found desirable to provide an incontinence urinal plug for females, which can be used as a restraining plug, or as a retaining catheter, and which can be adapted for use with a urinal leg bag with standard connections. To this end, I have devised a drainage catheter which has a preformed or shaped balloon for retention in the neck of the bladder, and a second preformed and shaped balloon which enters the urethra for a short distance, whereby the first balloon may be very lightly inflated to function as a retention balloon, and the second balloon may be simultaneously or subsequently inflated under low pressure, after a slight traction is applied, to function as a plug for preventing leakage. The catheter may drain freely or may be connected to a urinal leg bag.

Referring to the drawings, the catheter 10 includes a tubular body portion 11 having a tip 12, a drainage channel 13 connected to a drainage funnel 14, and one or more eyes 15 adjacent the tip and communicating with the drainage channel. A preformed balloon 16 is positioned on the body portion 11 spaced from but adjacent the tip 12, an inflation channel 17 being positioned in the wall 18 of the body portion, and preferably in an inflation tube 19 embedded in the wall, the channel 17 having its distal end 20 pierced and the wall 18 being pierced as indicated at 21 to communicate the inflation tube 19 with the interior of the balloon 16. The inflation tube 19 has its outer end formed as an inflating funnel 22.

A second preformed balloon 23 is positioned on the body portion 11 in spaced relation to the first balloon 16, as shown in the drawings, and has a separate inflation channel 24 in the wall 18 of the body portion, also preferably in an inflation tube 25 embedded in the wall 18, the channel 24 and the wall 18 being pierced as indicated at 26 to communicate the inflation tube 25 with the interior of the balloon 23, and the tube 25 having its outer end formed as an inflating funnel 27.

The balloon 16 is preferably of torus type, with side walls 28, 29 and an outer rounded wall 30 concentric with and in spaced relation to the tubular body portion 11. The balloon 23 is preferably of conical type, with an inner side wall 31, a rounded end wall 32, and an inclined outer conical wall 33, as illustrated. The balloons have the size and shape of an inflated balloon of the same capacity.

When used as an incontinence plug, the catheter is inserted in the urethra by means of a stylette, the tip 12 being reinforced as indicated at 34 for this purpose. The balloon 16 is seated in the bladder, and is slightly inflated with air through the inflation channel 17, the inflating funnel 22 then being closed by a plug or with a clamp. The catheter is then lightly retracted to seat the balloon 16 in place, and the balloon 23 is slightly inflated with air through the inflation channel 24 and its inflating funnel 27; the funnel 27 is then closed by a plug or with a clamp. It is preferred to have the funnel 27 of a darker or a different color than the funnel 22, to distinguish between them.

The above described construction provides separate inflating channels for the two balloons. Since the inflating pressure is preferably very slight, it may be preferred, in some instances, to inflate both balloons simultaneously. To this end, the catheter construction of Fig. 5 may be utilized, the catheter 35 having a tubular body portion 36 with a distal tip 37, drainage eyes 38, and a drainage passage 39 having an outflow funnel 40, the tip 37 being preferably reinforced; two preformed balloons 41, 42, spaced as illustrated, and shaped similar to the balloons 16 and 23, are mounted on the body portion 36 for inflation through an inflation channel 43 in the body portion wall 44 which has openings similar to the openings 21 and 26 communicating with the balloon interiors.

The inflation channel 43 is preferably provided in an inflation tube 45 which is imbedded in the wall 44, and which has an inflating funnel outer end 46, whereby the balloons 41 and 42 can be simultaneously inflated at low pressure, the funnel outer end 46 of the inflation channel 43 then being closed by a plug or a clamp.

The above described catheter construction provides an effective incontinence plug of light weight, as the catheter can be short to reduce weight; inflating fluid such as distilled water is not required, and the inflating air is of very low pressure, and if desired may be omitted, as the balloons assume their preformed shape in the body cavity as soon as the stylette is withdrawn. The weight of the catheter is negligible and comfort of the patient is facilitated.

The balloons being preformed and shaped as described will not rupture in use, as little or no inflating pressure is required. Further, a leak or the like will not collapse the balloons, or cause loss of function, the balloons being retained until the catheter is withdrawn by means of a stylette.

Although I have disclosed specific constructional embodiments of my invention, it is obvious that changes in the size, shape and arrangement of the parts may be made to meet different catheter and tube requirements, without departing from the spirit and the scope of the invention as defined in the appended claims.

I claim:

1. An incontinence urinal plug, having a tubular body portion with a longitudinal drainage channel, a closure tip closing the distal end of the plug, a drainage eye in the wall of the body portion at the distal end adjacent the closure tip communicating with the drainage channel, an inflation balloon of torus shape on the body portion adjacent the drainage eye, a second inflation balloon of conical shape on the body portion in spaced adjacent relation to the first balloon, and low pressure inflation channel means in the body portion communicating with said balloons.

2. An incontinence urinal plug, having a tubular body portion with a longitudinal drainage channel, a closure tip closing the distal end of the plug, a drainage eye in the wall of the body portion at the distal end adjacent the closure tip communicating with the drainage channel, an inflation balloon of torus shape on the body portion adjacent the drainage eye, a second inflation balloon of conical shape on the body portion in spaced adjacent relation to the first balloon, and separate low pressure inflation channel means in the body portion respectively communicating with said balloons.

3. An incontinence urinal plug, having a tubular body portion with a longitudinal drainage channel, a closure tip closing the distal end of the plug, a drainage eye in the wall of the body portion at the distal end adjacent the closure tip communicating with the drainage channel, an inflation balloon of torus shape on the body portion adjacent the drainage eye, a second inflation balloon of conical shape on the body portion in spaced adjacent relation to the first balloon, and low pressure inflation channel means in the body portion communicating with said balloons, said closure tip being reinforced for engagement by a stylette.

4. An incontinence urinal plug, having a tubular body portion with a longitudinal drainage channel, a closure tip closing the distal end of the plug, a drainage eye in the wall of the body portion at the distal end adjacent the closure tip communicating with the drainage channel, an inflation balloon of torus shape on the body portion adjacent the drainage eye, a second inflation balloon of conical shape on the body portion in spaced adjacent relation to the first balloon, and separate low pressure inflation channel means in the body portion respectively communicating with said balloons, said closure tip being reinforced for engagement by a stylette.

References Cited in the file of this patent

UNITED STATES PATENTS

| Number | Name | Date |
|---|---|---|
| 2,175,726 | Gebauer | Oct. 10, 1939 |
| 2,210,744 | Winder | Aug. 6, 1940 |
| 2,308,484 | Auzin | Jan. 19, 1943 |
| 2,330,399 | Winder | Sept. 28, 1943 |
| 2,473,742 | Auzin | June 21, 1949 |